Figure 1:
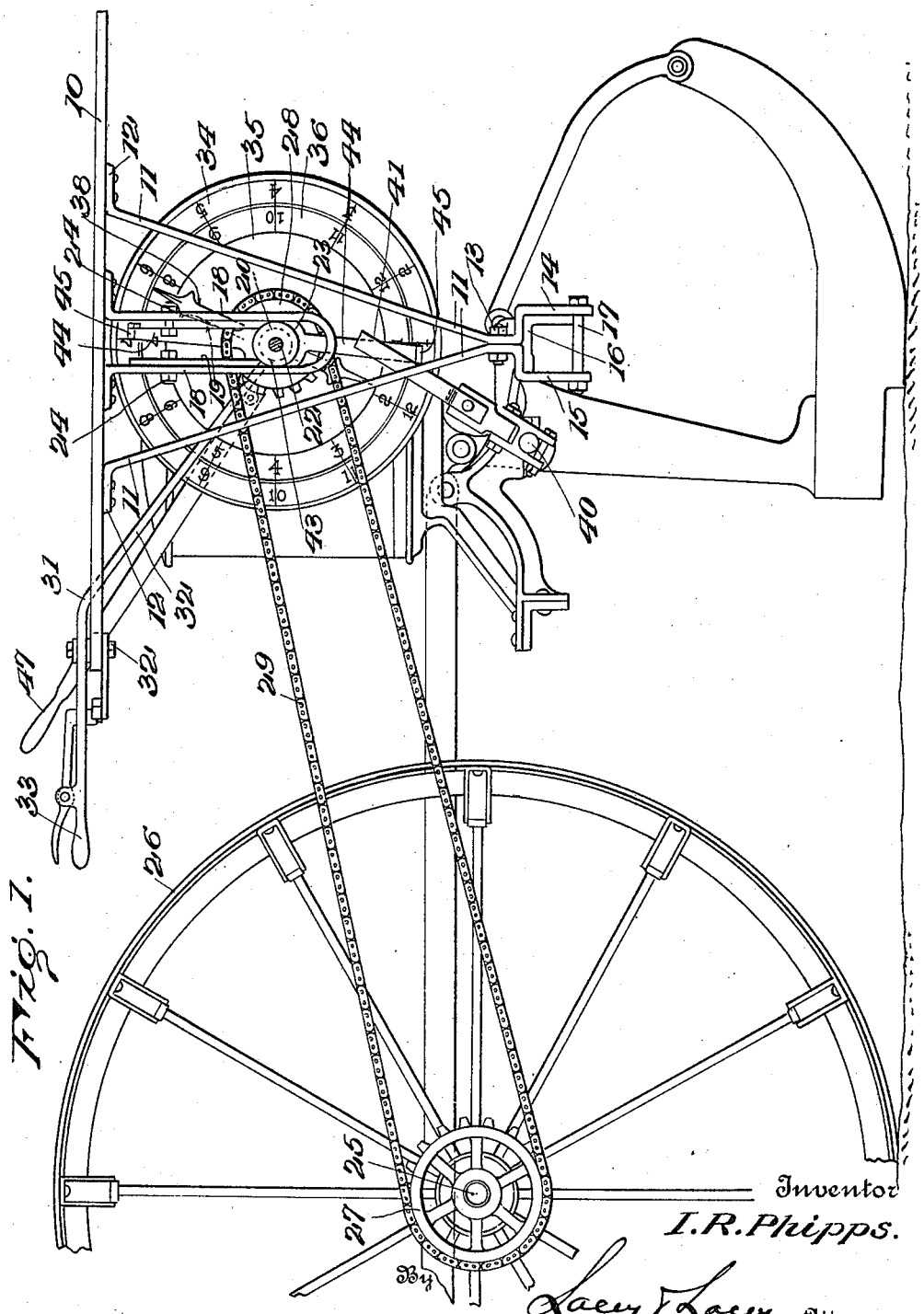

I. R. PHIPPS.
CHECK ROW ATTACHMENT FOR PLANTERS.
APPLICATION FILED OCT. 4, 1918.

1,310,710.

Patented July 22, 1919.
3 SHEETS—SHEET 2.

Inventor
I. R. Phipps.
By Lacey & Lacey
Attorneys

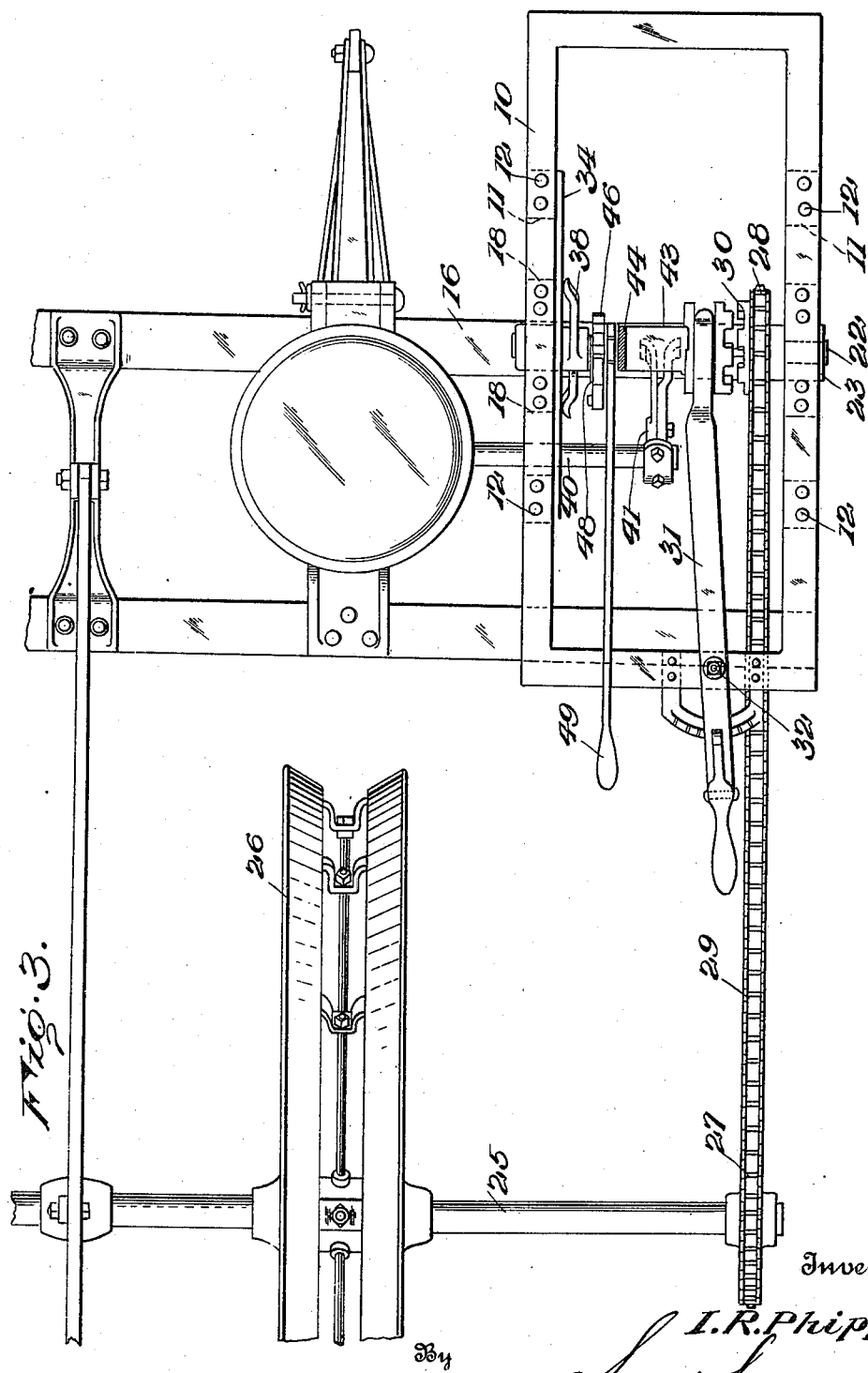

UNITED STATES PATENT OFFICE.

IRA R. PHIPPS, OF MATTOON, ILLINOIS.

CHECK-ROW ATTACHMENT FOR PLANTERS.

1,310,710.  Specification of Letters Patent.  Patented July 22, 1919.

Application filed October 4, 1918. Serial No. 256,829.

*To all whom it may concern:*

Be it known that I, IRA R. PHIPPS, a citizen of the United States, residing at Mattoon, in the county of Coles and State of Illinois, have invented certain new and useful Improvements in Check-Row Attachments for Planters, of which the following is a specification.

This invention relates to attachments for corn planters, more particularly to the class of check row planters, and has for one of its objects to provide an attachment operative from the traction members of the planter and adapted to actuate the tripping mechanism of the seed dropper which is usually operated by the check row wires, thus dispensing with cumbersome check wires.

Another object of the invention is to provide a device of this character whereby the distances between the hills are uniformly and accurately spaced both longitudinally and transversely of the field.

With these and other objects in view, the invention consists in certain novel features of construction, as hereinafter shown and described and then specifically pointed out in the claims; and in the drawings illustrative of the preferred embodiment of the invention—

Figure 2:
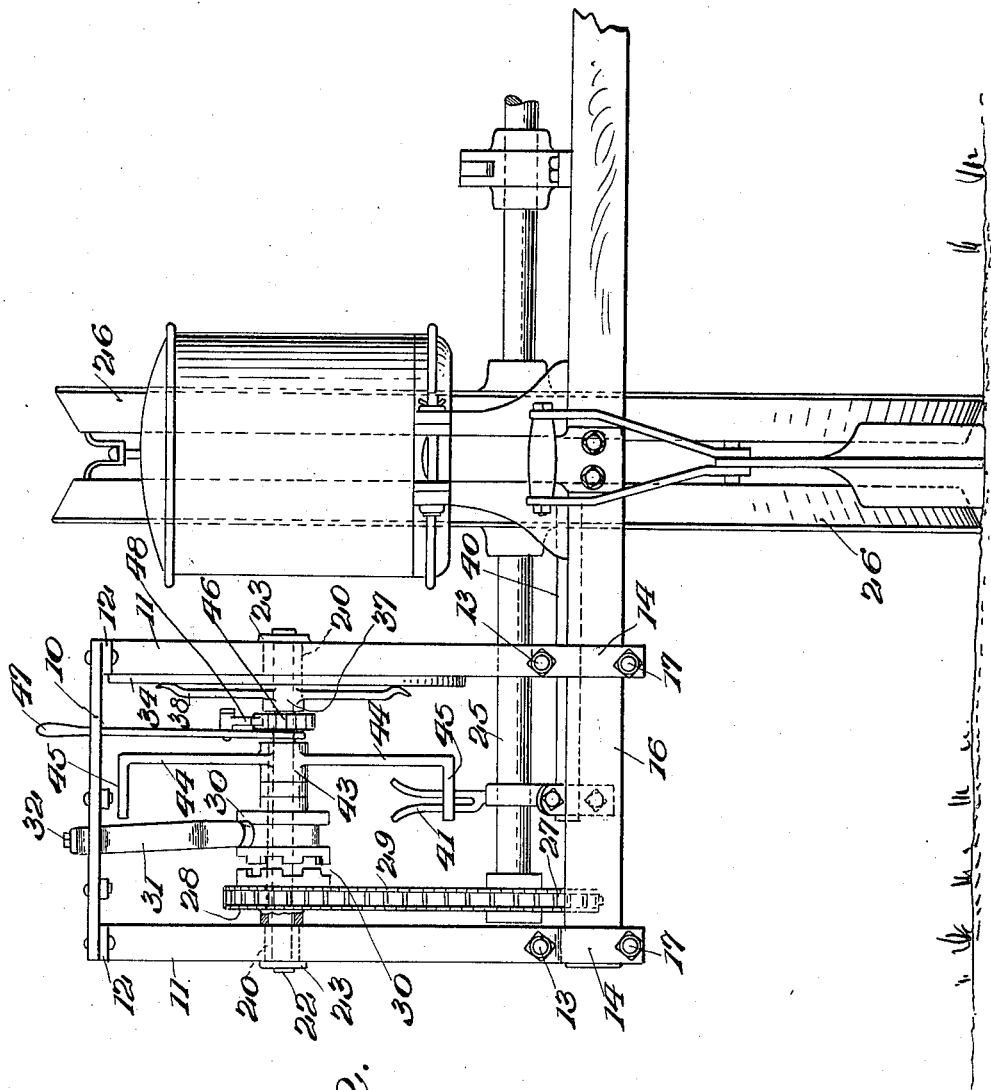

Figure 1 is a side elevation of a portion of a corn planter with the improvement applied, Fig. 2 is a front elevation of the parts shown in Fig. 1, Fig. 3 is a plan view of the parts shown in Fig. 1.

The ordinary check row corn planter generally includes a tripping lever adapted to be actuated at predetermined intervals in the travel of the machine by enlargements on a check wire stretched across the field but the check wires are troublesome and require changing at the end of each row.

The present invention dispenses with the check wire and actuates the trip device by a simple mechanism attached to the framework of the planter at any convenient point between the seed boxes and the planter shoes and including appliances adapted to engage the tripping lever of the seed dropper and actuate the same substantially in the same manner as when the check row wires are used.

The improved device comprises an upper supporting frame 10, preferably oblong, and having depending hangers 11 including main side members attached at their upper ends at 12 to the frame 10 and converging downwardly. At their meeting point, said members are united by a bolt or other fastening 13, their extremities being bent laterally as shown at 14 and 15 to engage over one of the frame members 16 of the seed box and dropper mechanism support. The portions 14 and 15 of the hangers are clamped in position on the member 16 by bolts 17 or other suitable fastening devices. Generally two of the hanger devices will be employed, as shown in Fig. 2, at opposite sides of the frame 10 which is consequently rigidly supported.

Depending from the frame 10, between the sides of the hangers 11, are other hangers, one of which is shown in Fig. 1. Each of the last-mentioned hangers is preferably formed from a single piece bent into U-shape whereby parallel sides 18 are produced, the terminals of which are united to the frame 10 by rivets or other suitable fastening devices. Disposed between the parallel sides of each of the hangers 18 is a shaft hanger, including spaced side members 19, adapted to support a sleeve or collar indicated at 20. Each sleeve 20 constitutes a bearing for a shaft 22 and is provided with an external flange 23 to hold the sleeves in position relative to the hangers 18. The shaft 22 is thus supported for rotation relative to the frame 10. The side members 19 of the shaft hangers are each provided with a plurality of perforations, in spaced relation, and adapted to receive holding bolts or like fastening devices 24 so that the hangers 19 and the shaft 22 are adapted to be adjusted vertically within the range of the apertures for the bolts 24.

The axle of the planter is represented at 25 and carries the usual combined traction and covering wheels 26. Attached to the axle 25 externally of one of the wheels 26 is a chain wheel 27, and connected to the shaft 22 is another chain wheel 28, a drive chain, represented at 29, engaging over the chain wheels 27 and 28 whereby the motion of the axle 25 is imparted to the shaft 22. A clutch device, represented as a whole at 30, is associated with the shaft 22 and operated by a lever 31 pivoted at 32 to the frame 10, to enable the motion to the shaft 22 to be controlled and stopped or started as required. The lever 31 is provided with a handle 33 convenient to the operator.

Secured rigidly to one pair of the hanger members 11 is a dial device 34 having two sets of graduations, an outer set indicated at 35 and an inner set indicated at 36. Keyed to the shaft 22 is a hub 37 having a finger or pointer 38 arranged to play over the dial.

The operating shaft for the seed dropper mechanism is represented at 40 and the tripper lever which is usually arranged to be operated by the check wire is represented at 41, and coupled in the usual manner to the shaft 40. Keyed upon the shaft 22 is a hub 43 having a trip arm 44 extending radially therefrom and provided at its end with a lateral offset 45 extending into the path of the lever 41. It will be obvious that when the clutch is closed, the shaft 22 will be rotated and the offsets 45 will actuate the lever 41 twice at each rotation of the shaft. The arms 44 thus perform the same function as the stops or projections on the check row wire.

The trip 44 and the pointer 38 are fixed to the shaft 22 and occupy the same position relative to each other at all times. Between the trip and the pointer, a ratchet wheel 46 is keyed to the shaft 22 and a lever 47 is loosely mounted on said shaft adjacent the ratchet wheel, said lever carrying a pawl 48 to engage the ratchet wheel. The graduations upon the dial, it will be readily noted, extend in opposite directions from the starting point or normal position of rest which may be numbered 1 as shown, or 0 if preferred.

The machine may, of course, be equipped with a marker which will define the position of a succeeding row as one row is being planted in the well-known manner.

When the machine has reached the side of the field and is to be turned, the clutch 30 is opened so that the rotation of the shaft 22 will cease and the position of the pointer relative to the inner circle of graduations will indicate the distance the machine traveled after dropping the last hill of seeds and, of course, the distance to be traveled in order to properly aline therewith the first hill in the row about to be started. After the machine has been turned and while the clutch is still open, the lever 47 is manipulated so as to act through the ratchet wheel 46 and actuate the shaft 22, turning said shaft, the pointer, and the trip arm until the pointer registers with that numeral of the outer circle of graduations having the same value as the numeral in the inner circle over which it came to rest. For instance, if the pointer stops over 5 in the inner circle when the machine is to be turned, the lever is manipulated after turning the machine to bring the pointer over 5 in the outer circle. The clutch is then thrown in and the machine driven along the row to be planted.

The improved device may be readily adapted without material structural change to check row corn planters of various forms and sizes, and without structural change of the planter. The improved device, as before stated, utilizes the trip lever 41 already in use upon the planter.

Having thus described the invention, what is claimed as new is:

1. The combination with a planter including a rocking seed dropper shaft, and an arm extending radially therefrom, of a drive shaft, a disk having outer and inner graduations concentric with said shaft, a pointer on said shaft movable over said graduations, an arm extending from the shaft into the path of the arm on the rocking seed dropper shaft and in fixed relation to the pointer, and means for operatively connecting the said shaft with the traction mechanism of the planter.

2. An attachment for planters comprising a supporting frame, hangers depending from said frame, means for securing said frame to the planter frame, shaft bearings movable vertically in said hangers, means mounted on the supporting frame for adjusting said bearings in said hangers, a shaft supported in said bearings, a dial concentric with said shaft, a pointer on the shaft movable over the dial, an arm extending from said shaft in fixed relation to the pointer and adapted to intermittently operate the seed dropper operating devices of the planter, and means for operatively connecting said shaft with the traction mechanism of the planter.

In testimony whereof I affix my signature.

IRA R. PHIPPS. [L. S.]

Copies of this patent may be obtained for five cents each, by addressing the "Commissioner of Patents, Washington, D. C."